(12) United States Patent
Powell et al.

(10) Patent No.: US 10,070,310 B2
(45) Date of Patent: Sep. 4, 2018

(54) METHOD AND SYSTEM FOR PROVISIONING ACCESS DATA TO MOBILE DEVICE

(71) Applicant: VISA INTERNATIONAL SERVICE ASSOCIATION, San Francisco, CA (US)

(72) Inventors: Glenn Powell, Fremont, CA (US); John F. Sheets, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 14/707,788

(22) Filed: May 8, 2015

(65) Prior Publication Data
US 2015/0327072 A1 Nov. 12, 2015

Related U.S. Application Data

(60) Provisional application No. 61/990,683, filed on May 8, 2014.

(51) Int. Cl.
*H04W 12/06* (2009.01)
*H04L 29/08* (2006.01)
(Continued)

(52) U.S. Cl.
CPC ............ *H04W 12/06* (2013.01); *H04L 63/10* (2013.01); *H04L 67/04* (2013.01); *H04W 12/08* (2013.01);
(Continued)

(58) Field of Classification Search
CPC ........... G06Q 20/3821; G06Q 20/4014; G06Q 20/409; G06Q 20/206; G06Q 20/3278;
(Continued)

(56) References Cited

U.S. PATENT DOCUMENTS

| 4,646,351 A | * | 2/1987 | Asbo | G07C 9/0015 |
| | | | | 178/20.03 |
| 4,766,293 A | * | 8/1988 | Boston | G06K 19/07 |
| | | | | 235/380 |

(Continued)

FOREIGN PATENT DOCUMENTS

| EP | 2674887 A1 | 12/2013 |
| EP | 2800338 A1 | 11/2014 |
| WO | 2007038896 A2 | 4/2007 |

OTHER PUBLICATIONS

International Search Report and Written Opinion, dated Jul. 15, 2016, in PCT Application No. PCT/US2016/026241, 12 pages.
(Continued)

*Primary Examiner* — Mamon Obeid
*Assistant Examiner* — Edgar R Martinez-Hernandez
(74) *Attorney, Agent, or Firm* — Kilpatrick Townsend & Stockton LLP

(57) ABSTRACT

A method and system for provisioning access data in a second application on a mobile device using a first application on the mobile device. Authentication data may be input into the first application, and an authentication code may be requested from a remote server. After the authentication code is received by the first application in the mobile device, it can pass the authentication code to a second application that initiates an access data provisioning process.

12 Claims, 9 Drawing Sheets

(51) Int. Cl.
*H04L 29/06* (2006.01)
*H04W 12/08* (2009.01)
*H04W 12/04* (2009.01)
*H04W 88/02* (2009.01)
*G06Q 20/32* (2012.01)

(52) U.S. Cl.
CPC ............ *G06Q 20/32* (2013.01); *H04W 12/04* (2013.01); *H04W 88/02* (2013.01)

(58) Field of Classification Search
CPC .. G06Q 20/325; G06Q 20/3255; G06Q 20/34; G06Q 20/3823; G06Q 20/401; G06Q 20/4012; G07C 9/00571; H04W 12/06; G07F 7/088
USPC .......................................................... 705/71
See application file for complete search history.

(56) References Cited

U.S. PATENT DOCUMENTS

| | | | | |
|---|---|---|---|---|
| 5,384,449 A * | 1/1995 | Peirce | ............... | G06Q 20/4037 235/380 |
| 6,003,014 A * | 12/1999 | Lee | ............... | G06Q 20/105 705/13 |
| 6,481,632 B2 * | 11/2002 | Wentker | ............... | G06F 8/60 235/376 |
| 7,539,861 B2 * | 5/2009 | Trench | ............... | G06Q 20/02 713/155 |
| 7,707,120 B2 * | 4/2010 | Dominguez | ............ | G06Q 20/02 705/30 |
| 8,245,044 B2 * | 8/2012 | Kang | ............... | G06Q 20/12 705/35 |
| 8,326,759 B2 * | 12/2012 | Hammad | ............ | G06Q 20/322 235/380 |
| 8,364,591 B2 * | 1/2013 | Rigby | ............... | G06Q 20/04 705/35 |
| 8,364,593 B2 * | 1/2013 | Trifiletti | ............... | G06Q 20/20 705/44 |
| 8,577,803 B2 * | 11/2013 | Chatterjee | ............... | G06Q 20/36 705/41 |
| 8,600,855 B2 * | 12/2013 | Winters | ............... | G06Q 20/10 705/26.35 |
| 8,601,266 B2 * | 12/2013 | Aabye | ............... | G06F 21/445 380/279 |
| 8,620,798 B2 * | 12/2013 | Faith | ............... | G06Q 20/40 705/35 |
| 8,763,142 B2 | 6/2014 | McGuire et al. | | |
| 2006/0006224 A1 * | 1/2006 | Modi | ............... | G06Q 20/02 235/379 |
| 2006/0049256 A1 * | 3/2006 | von Mueller | ............ | G06F 21/72 235/449 |
| 2006/0278704 A1 * | 12/2006 | Saunders | ............... | G06Q 20/10 235/382 |
| 2007/0011099 A1 * | 1/2007 | Sheehan | ............... | G06Q 20/32 705/65 |
| 2009/0030842 A1 * | 1/2009 | Hoffman | ............... | G06Q 20/04 705/66 |
| 2009/0119213 A1 * | 5/2009 | Hammad | ............... | G06Q 20/32 705/44 |
| 2009/0234751 A1 * | 9/2009 | Chan | ............... | G06Q 20/145 705/26.1 |
| 2010/0318468 A1 * | 12/2010 | Carr | ............... | G06Q 20/027 705/79 |
| 2010/0318783 A1 | 12/2010 | Raj | | |
| 2012/0240195 A1 * | 9/2012 | Weiss | ............... | H04L 63/0846 726/4 |
| 2012/0272307 A1 * | 10/2012 | Buer | ............... | G06F 21/34 726/9 |
| 2013/0041830 A1 | 2/2013 | Singh et al. | | |
| 2013/0198081 A1 * | 8/2013 | Royyuru | ............... | G06Q 20/322 705/44 |
| 2013/0212026 A1 * | 8/2013 | Powell | ............... | G06Q 20/3823 705/71 |
| 2013/0282588 A1 * | 10/2013 | Hruska | ............... | G06Q 20/10 705/67 |
| 2013/0304648 A1 * | 11/2013 | O'Connell | ............ | G06Q 20/3821 705/44 |
| 2013/0346305 A1 | 12/2013 | Mendes | | |
| 2014/0108263 A1 * | 4/2014 | Ortiz | ............... | G06Q 20/3278 705/71 |
| 2014/0263622 A1 * | 9/2014 | Babatz | ............... | G06Q 20/34 235/380 |
| 2015/0032627 A1 * | 1/2015 | Dill | ............... | G06Q 20/385 705/44 |
| 2015/0046339 A1 | 2/2015 | Wong et al. | | |
| 2015/0073996 A1 | 3/2015 | Makhotin et al. | | |

OTHER PUBLICATIONS

Chapter 13: Key Management Techniques, Menezes et al., Handbook of Applied Cryptography, CRC Press, Boca Raton, FL, 1996, pp. 543-590.

Extended European Search Report, dated Feb. 6, 2018, in EP Application No. 16789731.3, 8 pages.

* cited by examiner

METHOD AND SYSTEM FOR PROVISIONING ACCESS DATA TO MOBILE DEVICE

CROSS-REFERENCES TO RELATED APPLICATIONS

This application claims the benefit of U.S. Provisional Application No. 61/990,683, filed May 8, 2014, which is hereby incorporated by reference in its entirety for all purposes.

BACKGROUND

Mobile phones can utilize access data to obtain access to a resource or a location. For example, a mobile phone may include data which is passed to an access device to allow the user of the mobile phone to access a room in a building. In another example, the mobile phone may have access data such as account data which may allow the user of the mobile phone to access an account to obtain a good.

In many cases, a resource provider may provision the mobile phone with the access data. For example, a building operator system may provision a mobile phone with data that allows a user of the mobile phone to access a building. In another example, a bank may provision the mobile phone with data that allows the user of the mobile phone to access an account at the bank. In this particular situation, the resource provider can verify that the user of the mobile phone is in fact an authentic user. As a result, the transmission of access data to the mobile phone is relatively secure.

In some cases, mobile devices may contain applications which may perform multiple functions and/or may perform functions for more than one resource provider. In one example, a single application on a mobile phone that is to perform multiple functions or perform services for many resource providers may not be directly related to the resource providers associated with those functions or services. There can be a trust issue in this situation, since the resource provider may not have control over the single application. For example, if the access data that the service provider provides is highly sensitive, the service provider may not have full control over any security features of the single mobile application. Further, if the user requests that a resource provider provide access data to the user's mobile phone, the user may also not have trust that the data in the single mobile application is secure.

Embodiments of the invention are directed to methods and systems of improving data security. Embodiments of the invention address these and other problems, individually and collectively.

BRIEF SUMMARY

Embodiments of the invention are directed to methods and systems that improve security when provisioning access data to a mobile device.

One embodiment of the invention is directed to a method. The method includes receiving, by a mobile device, user authentication data at a first application on the mobile device, and then transmitting the user authentication data to an authorization computer system. The method also includes receiving, by the mobile device, from the authorization computer system, an authentication code via the first application. The authentication code is then provided from the first application to a second application on the mobile device. The mobile device then provides the authentication code to validation entity computer. The validation entity computer verifies the authentication code and instructs a provisioning server computer to provide access data to the second application on the mobile device.

Another embodiment of the invention is directed to a mobile device configured to perform the above described method.

Another embodiment of the invention is directed to a method. The method includes receiving, by an authorization computer system and from a mobile device, authentication data. The authorization computer system validates the authentication data and then creates an authentication code. The authentication code comprises a first portion comprising encrypted information and a second portion comprising unencrypted information, the unencrypted information capable of being used to process the unencrypted information. The encrypted information may include an encrypted time data element. The authorization computer system then transmits the authentication code to the mobile device. The authentication code is subsequently provided to a validation entity computer that initiates the provisioning of access data to the mobile device.

Another embodiment of the invention is directed to an authorization computer system configured to perform the above described method.

These and other embodiments are described in further detail below, with reference to the Figures and Detailed Description.

DETAILED DESCRIPTION

Figure 1:
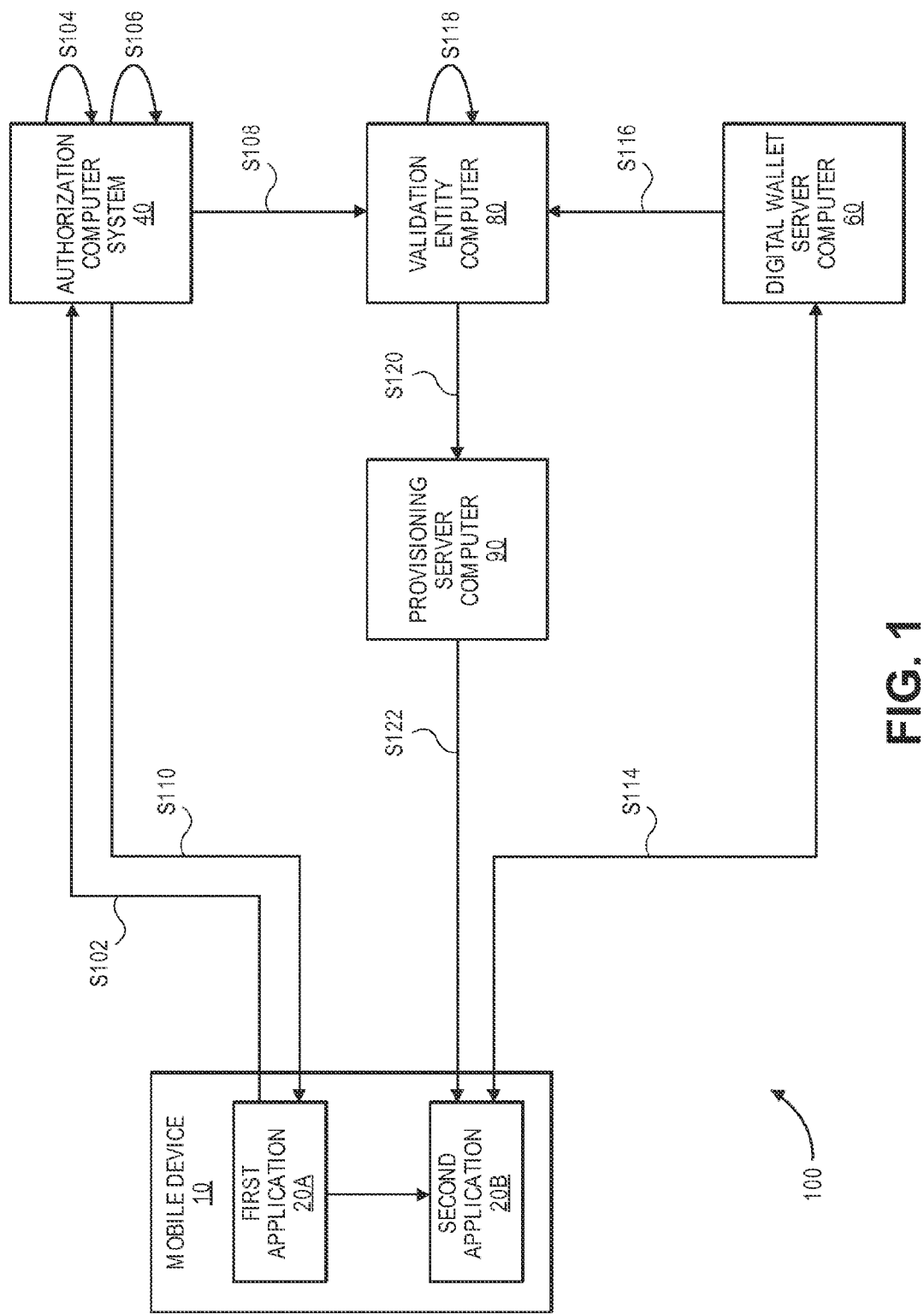
FIG. 1 shows a block diagram of a system according to an embodiment of the invention.

Embodiments of the invention can provide for a number of different mechanisms that can enhance security when accessing a resource through an untrusted application on a mobile device. In some embodiments, this can be accomplished by requesting an authentication code via a trusted application on the mobile device. In some embodiments, the activation code can include an encrypted time data element so that the activation code is time bound. A verification entity computer can use the time data element to decide if the activation code is still valid.

Some embodiments of the invention can include receiving, by a mobile device, user authentication data into a first application on the mobile device. Once the user authentication data is received by the first application on the mobile device, it is transmitted to an authorization computer system. The authorization computer system then verifies the authentication data. After it verifies the authentication data, it can then generate and transmit an authentication code to the first application in the mobile device. After the mobile device receives the authentication code, the first application in the mobile device can provide the authentication code to a second application on the mobile device via a second application API (application programming interface). The second application in the mobile device may then provide the authentication code to a validation entity computer. After the validation entity computer verifies the authentication code, it may transmit an instruction to a provisioning server to provide the access data to the second application in the mobile device.

In some embodiments, the authentication code can be a mobile banking authentication code and the first application can be a mobile banking application. The authentication code can be generated by an issuer once the consumer has been authenticated or authorized by the issuer for the purpose of personalizing the consumer's account information to a mobile device. The authentication code can be delivered to the party that will be provisioning account data to the mobile device. That party can authenticate the code prior to performing the provisioning process.

A high-level process flow according to an embodiment of the invention can be described as follows. First, an issuer validates the identity of the consumer and confirms that the consumer is authorized to receive payment account information at his mobile device. Second, the issuer securely creates the authentication code using its server computer. Third, the issuer delivers the authentication code to their mobile banking application on the consumer's mobile device. Fourth, the mobile banking application delivers the authentication code to a digital wallet provider application on the mobile device through an API (application programming interface). The digital wallet provider application in the mobile device then provides the authentication code to a remotely located digital wallet server computer. Fifth, the digital wallet server computer then delivers the authentication code to a validation entity computer, which can initiate the provisioning of payment account data or activation of the payment account in the digital wallet provider application on the mobile device. Once the digital wallet provider application on the mobile device is provisioned with payment account data, the mobile device can be permitted or authorized to conduct payment transactions.

Before discussing detailed embodiments of the invention, some descriptions of certain terms may be useful.

A "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, wearable devices (e.g., watches), vehicles (e.g., cars), etc. A mobile device may comprise any suitable hardware and software for performing such functions, and may also include multiple devices or components (e.g., when a device has remote access to a network by tethering to another device—i.e., using the other device as a relay—both devices taken together may be considered a single mobile device).

"Authentication data" may include any data suitable for authenticating a user or mobile device. Authentication data may be obtained from a user or a device that is operated by the user. Examples of authentication data obtained from a user may include PINs (personal identification numbers), passwords, etc. Examples of authentication data that may be obtained from a device may be include device serial numbers, hardware secure element identifiers, device fingerprints, phone numbers, IMEI numbers, etc.

A "validation entity computer" may be any suitable computer that can validate data. In embodiments of the invention, the data that can be validated may include an authentication code. It can be operated by a validation entity such as a payment organization, a payment processing network, a transit authority, a building system, a ticketing system, etc.

A "provisioning server computer" may include any suitable computer that can provision access data to a device.

"Access data" may include any suitable data that can be used to access a resource or create data that can access a resource. In some embodiments, access data may be account information for a payment account. Account information may include a PAN, payment token, verification values (e.g., CW, CVV2, dCVV, dCW2). In other embodiments, access data may be data that can be used to activate account data. For example, in some cases, account information may be stored on a mobile device, but may not be activated until specific information is received by the mobile device. This specific information may be characterized as access information in some embodiments. In other embodiments, access data could include data that can be used to access a location. Such information may be ticket information for an event, data to access a building, transit ticket information, etc.

An "application" may be a computer program that is used for a specific purpose.

A "time data element" may include data relating to any suitable time. For example, a time data element may be a time, date, month, year, or any suitable combination of the above. The time data element could also be derived from the time, date, month, year, or any suitable combination of the above. An encrypted time data element may be an data element that may include an encrypted time, date, month, year, and/or suitable combination of the above.

An "access device" may be any suitable device for obtaining access to a resource. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a user mobile device.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CW (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a computer readable medium that stores instructions that can be executed by a processor to implement a desired method. Examples of memories may comprise one or more memory chips, disk drives, etc. Such memories may operate using any suitable electrical, optical, and/or magnetic mode of operation.

I. Systems

FIG. 1 shows a block diagram of a system according to an embodiment of the invention. FIG. 1 shows a mobile device 10 in communication with an authorization computer system 40, a provisioning server computer 90, and a digital wallet server computer 60. The mobile device 10 may store a first application 20A and a second application 20B. A validation entity computer 80 is in communication with the provisioning server computer 90 and the digital wallet server computer 60. The authorization computer system 40 is in communication with the validation entity computer 80.

The provisioning server computer 90 may be configured to provision the mobile device 10 with access data. It may include a processor and a computer readable medium comprising code which causes the processor to perform any suitable method associated with provisioning the mobile device 10 with access data. It may also maintain a database of addresses (e.g., an IP or internet protocol address or phone number) for various mobile devices that can be provisioned with access data.

The digital wallet server computer 60 may be configured to maintain a digital wallet associated with the user of the mobile device 10 as well as other users. A "digital wallet" can store user profile information, payment information (e.g. PANs or primary account numbers, payment tokens (i.e., PAN substitutes), verification values such as CVVs, etc.), bank account information, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Figure 2:
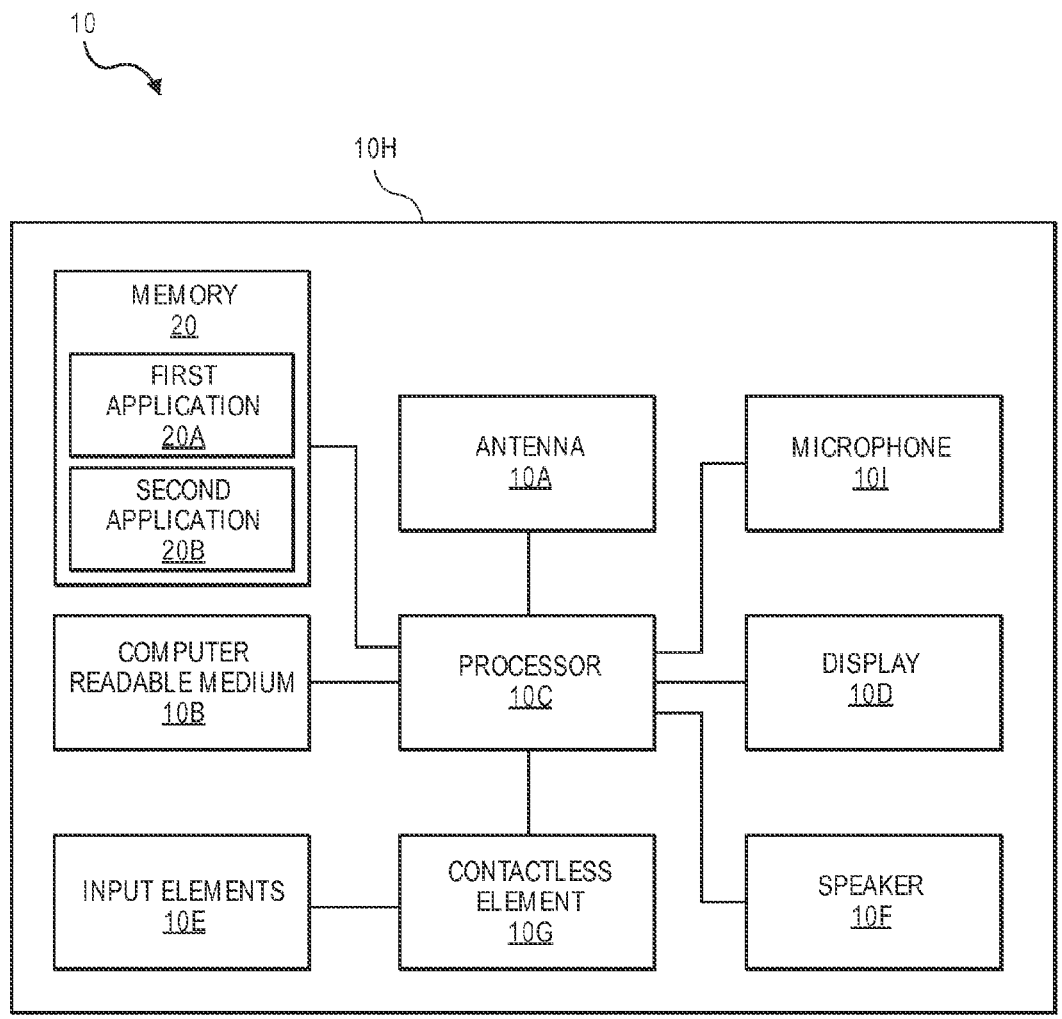
FIG. 2 shows a block diagram of a mobile device according to an embodiment of the invention.

FIG. 2 shows a block diagram of a mobile device 10 according to an embodiment of the invention. In some embodiments, the mobile device 10 may be a payment device that can be used to make payments or a device which can allow a user to gain access to a location. The exemplary mobile device 10 may comprise a computer readable medium 10B that be present within the body 10H of the mobile device 10. The computer readable medium 10B may be in the form of a memory that stores data. In some cases, the memory 10B may also store information such as access data. In general, any of this information may be transmitted by the mobile device 10 to another device, using any suitable method, including the use of antenna 10A or contactless element 10G. The body 10H may be in the form a plastic substrate, housing, or other structure.

The computer readable medium 10B may comprises code, executable by the processor for implementing a method comprising receiving user authentication data at a first application on the mobile device; transmitting, by the mobile device, the user authentication data to an authorization computer system; receiving, by the mobile device, from the authorization computer system, an authentication code via the first application; providing, by the mobile device, the authentication code from the first application to a second application on the mobile device; providing, by the mobile device, the authentication code to a validation entity computer, wherein the validation entity computer verifies the authentication code; and receiving, from a provisioning server, in communication with the validation entity computer, access data.

In some embodiments, the mobile device 10 may further include a contactless element 10G, which is typically implemented in the form of a semiconductor chip (or other data storage element) with an associated wireless transfer (e.g., data transmission) element, such as an antenna. Contactless element 10G may be coupled to (e.g., embedded within) the mobile device 10 and data or control instructions that are transmitted via a cellular network may be applied to the contactless element 10G by means of a contactless element interface (not shown). Contactless element 10G may be capable of transferring and receiving data using a short range wireless communication capability. As noted above, mobile device 10 may comprise components to both be the interrogator device (e.g. receiving data) and the interrogated device (e.g. sending data). Thus, the mobile device 10 may be capable of communicating and transferring data or control instructions via both cellular network (or any other suitable wireless network—e.g. the Internet or other data network) and short range communications.

The mobile device 10 may also include a processor 100 (e.g., a microprocessor) for processing the functions of the mobile device 10 and a display 10D to allow a consumer to see phone numbers and other information and messages. The mobile device 10 may further include input elements 10E to allow a user to input information into the device, a speaker 10F to allow the user to hear voice communication, music, etc., and a microphone 10I to allow the user to transmit her voice through the mobile device 10. The mobile device 10 may also include an antenna 10A for wireless data transfer (e.g., data transmission).

A memory 20 may be coupled to the processor 100 and may store a first application 20A and a second application 20B. In some embodiments, the memory 20 in the mobile device 10 may also include a secure storage area for storing sensitive data such as payment credentials (account numbers, payment tokens, verification values, etc.) and access data. For example, the memory 20 may be part of or may contain a secure element.

In some embodiments, the first application 20A is an application that is specifically associated with the authorization computer system 40 and is generally trusted by the authorizing entity associated with the authorization computer system 40. The first application 20A may be, for example, an issuer application such as a mobile banking application. Such applications are generally designed by the authorizing entity and can include data security measures that are specifically required by the authorizing entity.

The second application 20B may be associated with an entity such as the digital wallet server computer 60. The second application 20B is generally less trusted by the authorizing entity that operates the authorization computer, since the second application 20B was not developed by the authorizing entity. Examples of second applications may include digital wallet applications, merchant applications, fitness applications, and any other suitable application that may be present on the mobile device 10.

Figure 3:
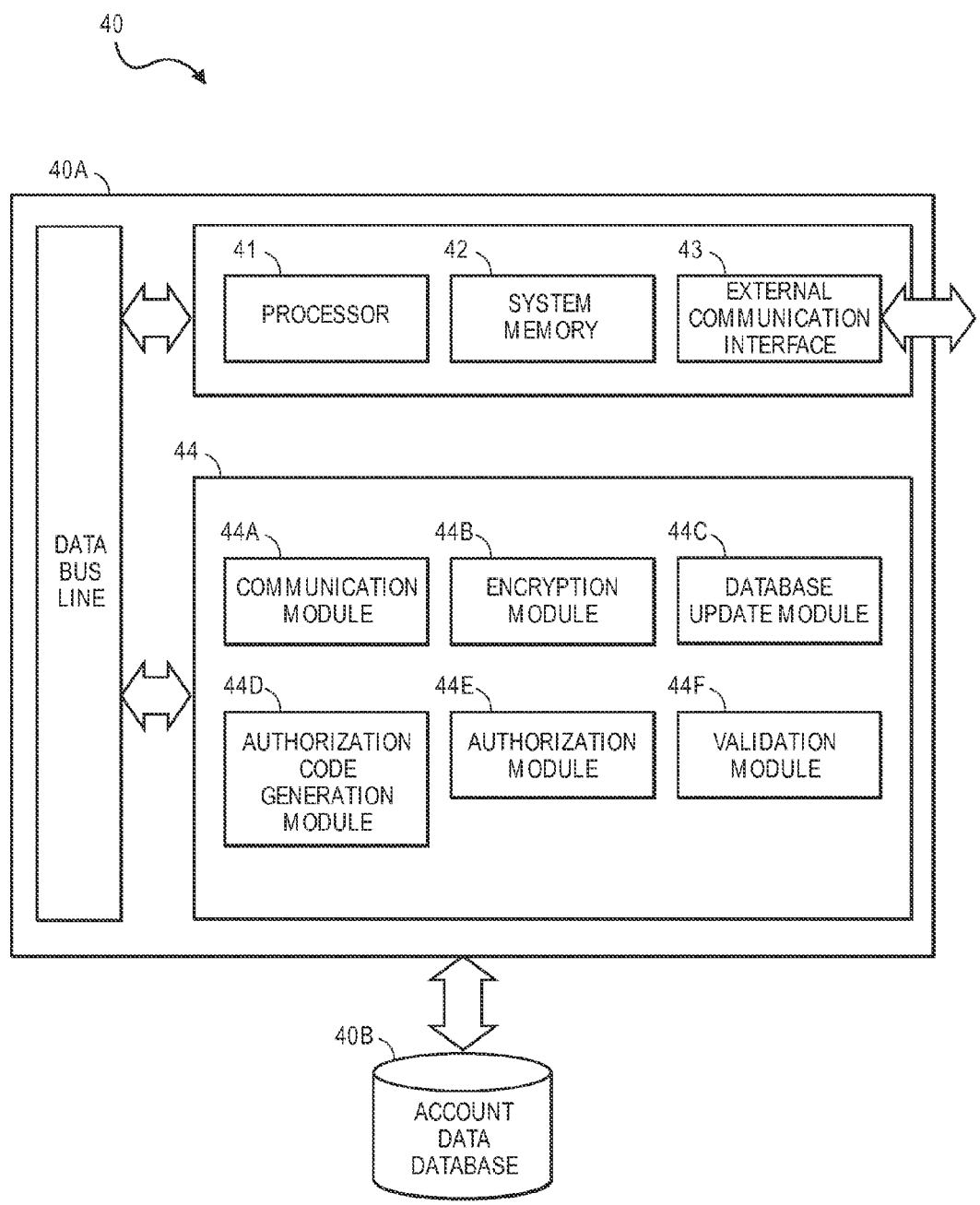
FIG. 3 shows a block diagram of an authorization computer according to an embodiment of the invention.

FIG. 3 shows a block diagram of an authorization computer system 40 according to an embodiment of the invention. FIG. 3 shows a server computer 40A and an account data database 40B coupled to the server computer 40A.

The account data database 40B may hold accounts of various users that are affiliated with the authorizing entity associated with the authorization computer system. For example, the authorizing entity may be an issuer bank and the database 40B may store account information for credit and debit card accounts for its customers.

The database 40B (as well as any other database described herein) may be a conventional, fault tolerant, relational, scalable, secure database such as Oracle™ or Sybase™. The database 1204 may be implemented using various standard data-structures, such as an array, hash, (linked) list, structured text file (e.g., XML), table, and/or the like. Such data-structures may be stored in memory and/or in (structured) files.

The server computer 40A may comprise a processor 41, which may be coupled to a system memory 42 and an external communication interface 43. A computer readable medium 44 may also be operatively coupled to the processor 41.

The computer readable medium 44 may comprise a number of software modules including a communication module 44A, an encryption module 44B, a database update module 44C, an authorization code generation module 44D, an authorization module 44E, and a validation module 44F.

The communication module 44A may comprise code that causes the processor 41 to generate messages, forward messages, reformat messages, and/or otherwise communicate with other entities.

The encryption module 44B may include any suitable encryption algorithms to encrypt data in embodiments of the invention. Suitable data encryption algorithms may include DES, triple DES, AES, etc. It may also store encryption keys that can be used with such encryption algorithms. The encryption module 44B may utilize symmetric or asymmetric encryption techniques to encrypt and/or verify data.

The database update module 44C may work in conjunction with the processor 41 to update account information in the account data database 40B.

The authorization code generation module 44D may comprise computer code, which when executed by the processor 41, generates an authentication code. Specific authentication code generation processes are described in detail below.

The authorization module 44E may comprise code that can cause the processor 41 to evaluate authorization request messages for transactions and determine if the transactions should be authorized. Such transactions may be authorized or declined based upon a number of factors including the level of potential fraud and/or the amount of funds or credit associated with the accounts being used to conduct the transactions.

The validation module 44F may comprise code, which causes the processor 41 to validate authentication credentials received from a user's mobile device. The validation module 44F may include code for causing the processor 41 to retrieve data from the database 40B and compare it to received data.

The computer readable medium 44 may comprise code, executable by the processor to implement a method comprising: receiving, by an authorization computer and from a mobile device, authentication data; validating, by the authorization computer, the authentication data; determining, that the authentication data are valid, in response to determining that the authentication data are valid; creating an authentication code, wherein the authentication code comprises a first portion comprising encrypted information comprising an encrypted time data element and a second portion comprising unencrypted information, the unencrypted information capable of being used to process the unencrypted information; and transmitting the authentication code to the mobile device, wherein the authentication code is provided to a validation entity computer that initiates the provisioning of access data to the mobile device.

Figure 4:
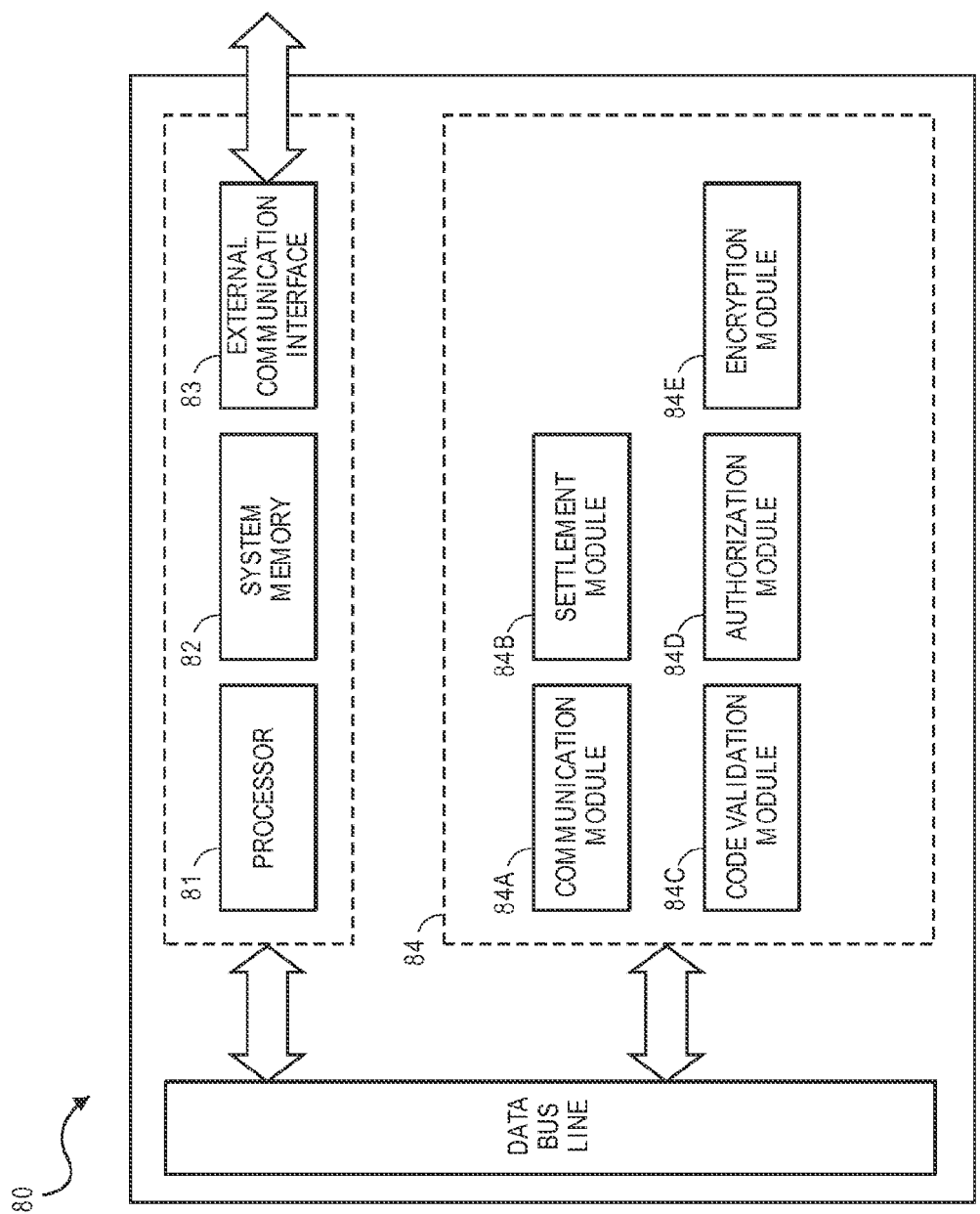
FIG. 4 shows a block diagram of a validation computer according to an embodiment of the invention.

FIG. 4 shows a block diagram of a validation entity computer 80 according to an embodiment of the invention. The validation entity computer 80 may also be in a payment processing network in some embodiments of the invention. The validation entity computer 80 may comprise a processor 81, which may be coupled to a system memory 82 and an external communication interface 83. A computer readable medium 84 may also be operatively coupled to the processor 81.

In some embodiments, the validation computer 80 may be part of a payment processing network that switches transaction request and responses between issuers and acquirers. A payment processing network may be a transaction processing network. A transaction processing network may process payment transactions or other types of access transactions.

The computer readable medium 84 may comprise a number of software modules including a communication module 84A, a settlement module 44B, a code validation module 84C, an authorization module 84D, and an encryption module 84E.

The communication module 84A may comprise code that causes the processor 81 to generate messages, forward messages, reformat messages, and/or otherwise communicate with other entities.

The settlement module 84B may comprise code that causes the processor 81 to settle transactions between various entities including issuers and acquirers.

The code validation module 84C may comprise code that causes the processor 81 to analyze a received authentication code to determine if the received authentication code is valid. In some embodiments, the validation module 84C may obtain a recently received authentication code and may decrypt (or work with the encryption module 84E) any encrypted data. It may then retrieve a previously received authentication code previously received from the authorization computer system and decrypt any encrypted data as well. The decrypted data may then be compared to determine of the currently received authentication code and the previously stored authentication code match (thereby validating the received authentication code).

The authorization module 84D may comprise code that can cause the processor 81 to evaluate authorization request messages for transactions and determine if the transactions should be authorized. The authorization module may also include code for routing or modifying authorization request and response messages as they pass between various parties such as issuers and acquirers.

The encryption module 84E may include any suitable encryption algorithms to encrypt data in embodiments of the invention. Suitable data encryption algorithms may include DES, triple DES, AES, etc. It may also store encryption keys that can be used with such encryption algorithms. The other keys of any corresponding key pairs may be stored encryption module 44B in the authorization computer system 40. The encryption module 84E may utilize symmetric or asymmetric encryption techniques to encrypt and/or verify data.

II. Methods

Figure 5:
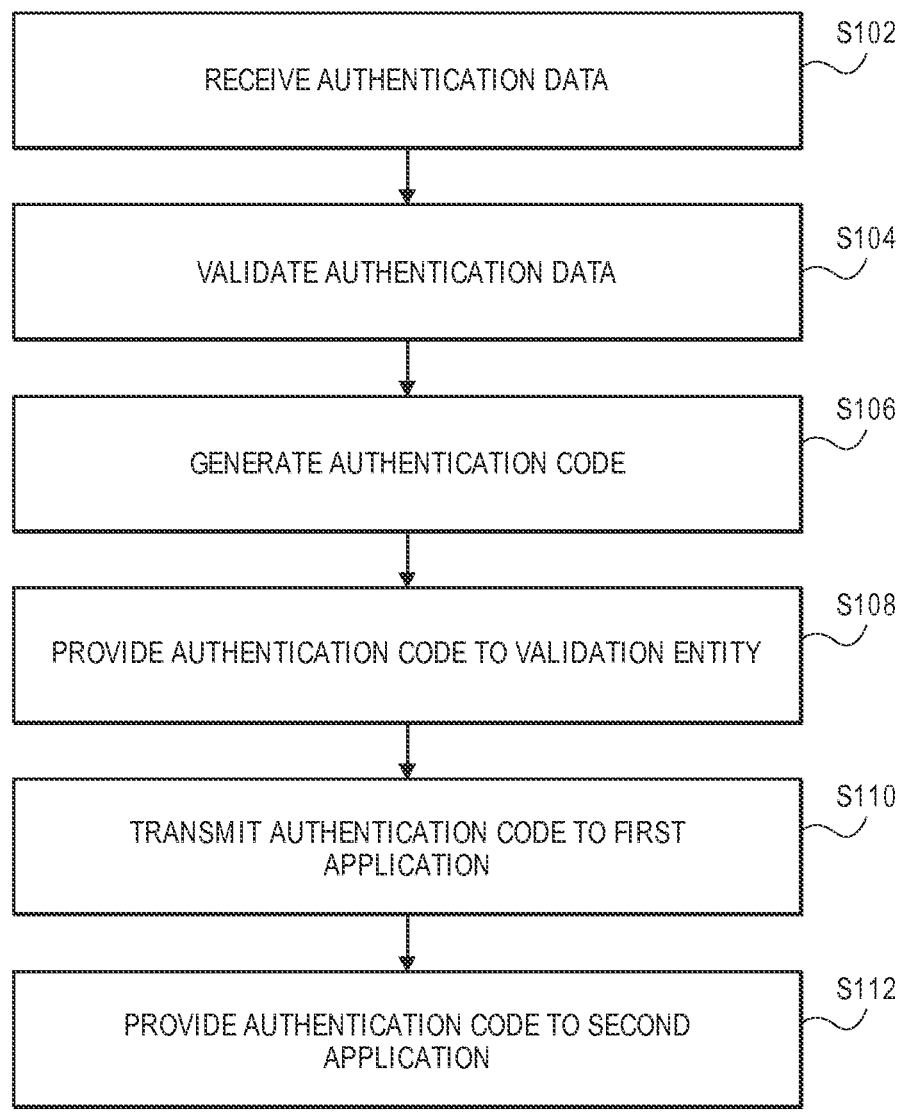
FIG. 5 shows a flowchart illustrating a method for providing an authentication code to a second application on a mobile device.
Figure 6:
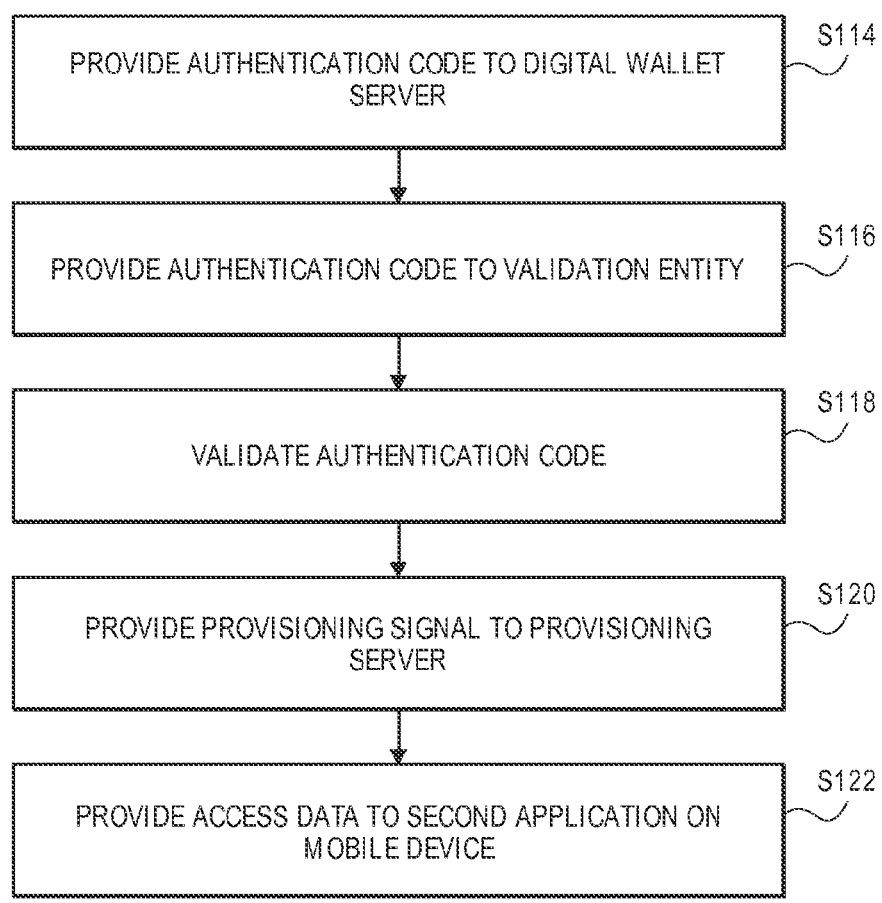
FIG. 6 shows a flowchart illustrating a method for provisioning access device to a mobile device.

FIG. 5 shows a flowchart illustrating a method for providing an authentication code to a second application on a mobile device. FIG. 6 shows a flowchart illustrating a method for provisioning access device to a mobile device. The methods shown in FIG. 5-6 can also be described with reference to the system diagram of FIG. 1. Although the methods that are specifically described below can relate to payment processing, embodiments of the invention can be applied to other areas that do not require payment.

Prior to step S102, a user may wish to load access data into the second application 20B. In some embodiments, the second application 20B may be a digital wallet application that is associated with the digital wallet server computer 60. The access data may be payment account data such as credit card account data, or activation data which may be used to activate payment account data already residing on the mobile device.

In embodiments of the invention, the user may initiate the loading process by launching or otherwise interacting with the first application 20A on the mobile device 10. The first application 20A may be an issuer application (e.g., a mobile banking application) that is associated with the authorization computer system 40. The authorization computer system may be an issuer computer system.

After launching the first application 20A, the first application 20A may present the user with an option to load an account number (e.g., a credit card account number) to the second application 20B. In doing so, the first application may also ask the user to input the user's authentication data and any account identifier associated with the account number to be loaded to the second application 20B. For example, the first application 20A may ask the user of the mobile device 10 for a previously identified PIN (personal identification number) or password. Alternatively or additionally, the first application 20A may gather authentication data (e.g., a serial number, phone number, digital fingerprint, etc.) directly from the mobile device 10. In some cases, this can be done automatically without or without any user input or action.

In step S102, the authentication data is transmitted from the mobile device 10 and is received at the authorization computer system 40. The authentication data may be transmitted from the mobile device 10 to the authorization computer system 40 using any suitable electronic message format including an e-mail, a short messaging service (SMS) message, a multimedia messaging service (MMS) message, a hypertext transfer protocol (HTTP) request message, a transmission control protocol (TCP) packet, a web form submission, etc. The message may be directed to any suitable location, such as an e-mail address, a telephone number, an internet protocol (IP) address, or a uniform resource locator (URL). The other communications that are described with respect to FIG. 1 may occur in the same or different manner.

In step S104, the authorization computer system 40 validates the authentication data. It may do so by retrieving authentication data that was previously stored for the user, and then comparing the retrieved authentication data to the received authentication data. For example, the authorization computer system 40 may store a password, can receive the corresponding password from the mobile device 10, and can determine if the stored password matches the received password. If the received authentication data does not match the previously stored authentication data, then a message may be generated and transmitted by the authorization computer system 40 to the mobile device 10 indicating that the entered authentication data is incorrect.

In step S106, if the received authentication data does match the previously stored authentication data, then the authorization computer system 40 may generate an authentication code.

The authentication code may be generated in any suitable manner. The authentication code may be generated using an encryption process. In some embodiments, the authentication code may include an encrypted portion and a non-encrypted portion. The non-encrypted portion may be used to decrypt the encrypted portion. Further, the encrypted portion may include a consumer's primary account identifier (PAN), a date and time when the authentication code was generated (an example of a time data element) or when the user was validated by the authorizing entity, and specific authorization code generated by the authorization entity. By encrypting the date and time when the authentication code was generated or when the user was validated by the authorizing entity, a validating entity computer validating the authentication code can determine if it is still valid. Specific methods for generating authentication codes according to embodiments of the invention are described in further detail below. Also, by creating an authentication code with an encrypted portion and a non-encrypted portion, the authentication code can include information on how to recover any secret that is present in the encrypted portion. Multiple separate data transmissions to provide information regarding the decryption of encrypted information are not needed.

In step S108, after the authentication code is generated, it is provided to the validation entity computer 80 using a communication path that is separate from and does not involve the mobile device 10, or the digital wallet server computer 60. The validation entity computer 80 may store the received authentication code in a database.

In step S110, the authentication code is transmitted from the authorization computer system 40 to first application 20A in the mobile device 10.

In step S112, after the first application 20A in the mobile device 10 receives the authentication code, the first application 20A then passes the authentication code to the second application 20B in the mobile device 10 through an appropriate API (application programming interface).

In step S114, after the authentication code is received by the second application 20B, the mobile device 10 then transmits the authentication code to the digital wallet server computer 60 using any suitable electronic message format.

In step S116, after the digital wallet server computer 60 receives the authentication code, the digital wallet server computer 60 then transmits the authentication code to the validation entity computer 80 using any suitable electronic message format.

In step S118, after the validation entity computer 80 receives the authentication code, the validation entity computer 80 then verifies that the received authentication code is the same as the authentication code that we previously received from the authorization computer system 40. In some embodiments, the validation module 84C in the validation entity computer 80 may take the recently received authentication code and may decrypt (or work with the encryption module 84E) any encrypted data. It may then retrieve a previously received authentication code previously received from the authorization computer system (stored in a database) and decrypt any encrypted data as well. The decrypted data from the previously stored and recently received authentication codes may then be compared to determine if the currently received authentication code and the previously stored authentication code match (thereby validating the received authentication code).

The validation entity computer 80 and the authorization computer system 40 may share symmetric encryption keys that will allow them to encrypted and decrypt authentication codes or portions thereof. In other embodiments, the authorization computer system and the validation entity computer may respectively utilize a public key to encrypt a portion of an authentication code and a private key to decrypt the portion of the authentication code. If the authentication code received from the authorization computer system 40 does not match the authentication code received from the digital wallet server computer 60, then a message may be transmitted to the mobile device 10 indicating that the provisioning request has failed.

In step S120, if the authentication code received from the authorization computer system 40 does match the authentication code received from the digital wallet server computer 60, the validation entity computer 80 then initiates the provisioning process. This can be done in a number of ways. In some cases, the validation entity computer 80 can transmit a message to the provisioning server computer 90 to request that the second application of the mobile device be provisioned with the access data requested by the user of the mobile device 10. In another embodiment, the provisioning server computer 90 may be part of the validation entity computer 80 and provisioning may be initiated without the transmission of any particular provisioning instruction message. If a provisioning instruction message is used, it may contain the details needed to provision the mobile device 10 with access data. Such details may include the access data itself (if it is not already stored at the provisioning server computer 90), the address (e.g., phone number) associated with the mobile device 10 to be provisioned), any data that is used by the mobile device 10 that allows the mobile device 10 to accept the access data, etc.

In step S122, the provisioning server computer 90 transmits the access data to the second application 20B in the mobile device 10 for storage. The mobile device 10 may thereafter be used to conduct payment transactions using the second application 20B and the access data that was provisioned to it. In some cases, the access data may be stored in a secure area (e.g., a secure element) in the mobile device 10.

The above described process can be used to provision static or dynamic access data to a mobile device. If the access data is dynamic, it may be provided to the mobile device for every transaction or for a predetermined number of transactions (e.g., for every 5-10 transactions). This helps to ensure that the risk of fraud resulting from man-in-the-middle attacks is reduced.

Figure 7:
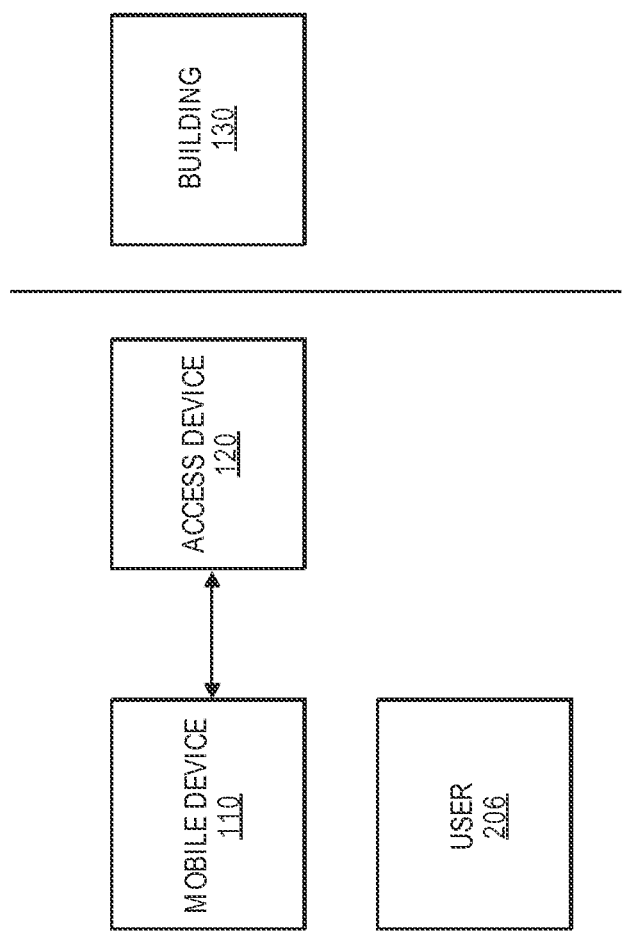
FIG. 7 shows a block diagram of a building access system.
Figure 8:
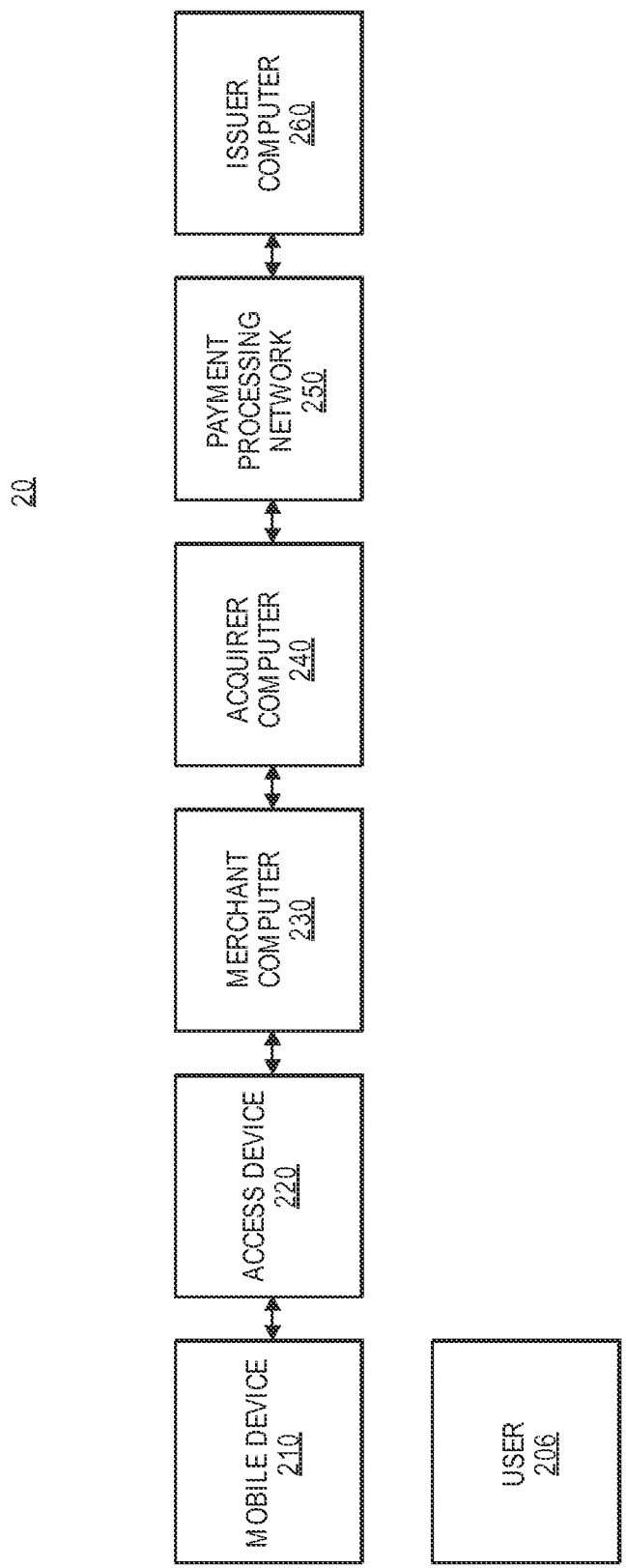
FIG. 8 shows a block diagram of a transaction processing system that can use a mobile device with access data.

Once the mobile device 10 is provisioned with access data, it may be used to conduct an access transaction. FIG. 7 illustrates a system including a mobile device that is provisioned with access data and that can allow a user to access a location such as a building. FIG. 8 illustrates a payment processing system that includes a mobile device that is provisioned with access data and that allows a user to access an account to pay for a good or service at a merchant.

FIG. 7 shows a block diagram of a building access system. FIG. 7 shows a mobile device 110 operated by a user 206. The mobile device 110 has been provisioned with access data as described above. The mobile device 110 can interact with the access device 120 and pass access data to the access device 120. The access device 120 may locally verify the received access data or it may communicate with a remotely located authentication server computer (not shown). The remotely located authentication server computer may verify that the access data is authentic and may transmit a signal indicating this back to the access device 120. The access device 120 may then proceed to let the user 206 enter the building 130.

FIG. 8 shows a block diagram of a transaction processing system that can use a mobile device with access data. FIG. 8 shows a user 206 that can operate a mobile device 210. The user 206 may use the mobile device 210 to pay for a good or service at a merchant. The merchant may operate a merchant computer 230 and/or an access device 220. The merchant may communicate with an issuer computer 260 via an acquirer computer 240 and a payment processing network 250.

The payment processing network 250 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a mobile device 210 at an access device 220 (e.g. POS location) can be described as follows. A user 206 presents his or her mobile device 210 to an access device 220 to pay for an item or service. The mobile device 210 and the access device 220 interact such that access data from the mobile device 210 (e.g. PAN, a payment token, verification value(s), expiration date, etc.) is received by the access device 220 (e.g. via contact or contactless interface). The merchant computer 230 may then receive this information from the access device 220 via an external communication interface. The merchant computer 230 may then generate an authorization request message that includes the information received from the access device 220 (i.e. information corresponding to the mobile device 210) along with additional transaction information (e.g. a transaction amount, merchant specific information, etc.) and electronically transmits this information to an acquirer computer 240. The acquirer computer 240 may then receive, process, and forward the authorization request message to a payment processing network 250 for authorization.

In general, prior to the occurrence of a credit or debit-card transaction, the payment processing network 250 has an established protocol with each issuer on how the issuer's transactions are to be authorized. In some cases, such as when the transaction amount is below a threshold value, the payment processing network 250 may be configured to authorize the transaction based on information that it has about the user's account without generating and transmitting an authorization request message to the issuer computer 260. In other cases, such as when the transaction amount is above a threshold value, the payment processing network 250 may receive the authorization request message, determine the issuer associated with the mobile device 210, and forward the authorization request message for the transaction to the issuer computer 260 for verification and authorization. Once the transaction is authorized, the issuer computer 260 may generate an authorization response message (that may include an authorization code indicating the transaction is approved or declined) and transmit this electronic message via its external communication interface to payment processing network 250. The payment processing network 250 may then forward the authorization response message to the acquirer computer 240, which in turn may then transmit the electronic message to comprising the authorization indication to the merchant computer 230, and then to the access device 220.

At the end of the day or at some other suitable time interval, a clearing and settlement process between the merchant computer 230, the acquirer computer 240, the payment processing network 250, and the issuer computer 260 may be performed on the transaction.

III. Authentication Code Generation

The authentication code that is described above may be formatted in any suitable manner. For example, the data used to generate the authentication code can be cryptographically protected via encryption. Many different types of encryption schemes may be used. Any suitable key scheme can be established between the parties that create and verify the authentication code.

The cryptographically protected code may be encoded as needed for transport. For example, in embodiments of the invention, BASE-64, hexBinary or other encoding schemes may be used to transport the value in text-based messages. The scheme used can either be explicitly stated in a message that is used to transport the authentication code or can be implicit due to previous arrangements between the parties involved.

Prior to encryption, the data can be formatted according to a predetermined scheme. This format can contain general information applicable to all uses and use-specific data. In some embodiments, the data can be structured with the following data prior to enciphering:

Control information—used convey information to recipient necessary to process the information (e.g., formatting, character encoding)
Randomization digits or characters
Total length of the use-specific data
Use-specific data
Padding (as necessary for the cryptographic scheme)

The use-specific data can be formatted in a manner such that the data content is self-evident. The use-specific data can include a time data element when the code is time-sensitive. The padding scheme, if used, will be identifiable from the control information.

A. Formatting the Authentication Code

In some embodiments, the authentication code comprises two major parts, each of which may contain multiple elements. The first part may include clear-text information. The clear-text information includes information that is needed to process the encrypted information. The second part may include encrypted information. The encrypted information contains protected data supplied by the authorizing entity (e.g., an issuer) to enable a validation entity (e.g., a payment processor or an access authority) to verify the authenticity and validity of the authentication code.

The first and second parts can be concatenated together to construct the authentication code. The authentication code can be received at a first application, and then conveyed to a second application (e.g., via a digital wallet provider's API) on a mobile device as a single data element. In some embodiments, the constructed authentication code can conform to the following layout, where each component value is separated by a hyphen (-): type-version-keyindex-encryptedinformation "Type" can be a clear-text component that identifies the type of authentication code that is present. For example, the type of code may be a payment account provisioning code, a building access code, a payment account activation code, etc. The "type" can be in any suitable form including letters, numbers, symbols, etc. For example, a mobile banking activation authentication code have the form "MBAAC."

"Version" can be a clear-text component that specifies the format or version of the authentication code that was constructed by the issuer.

"Key index" can be a clear-text component that identifies the specific data encryption key that was used to encrypt the encryptedinformation component. This value can be coordinated with between the authorization entity and the validation entity. It may be expressed as a positive integer or as any other suitable symbol, character, or identifier.

"Encrypted information" can be a component that contains multiple data elements that are formatted according to a specific syntax in ASCII text, encrypted and then hexBinary encoded prior to inclusion in an Authentication Code data field. Each of the elements contained within the encryptedinformation component can use a name/value pair syntax, with each name/value pair separated by a semicolon. Name/value pairs can utilize the following syntax: name=value.

In some embodiments, the following data elements can be included within the encryptedinformation component to create an authentication code that can be used to provision a second application on a mobile device with account data:

| NAME | DESCRIPTION |
|---|---|
| pan | Contains the consumer's PAN (or primary account number) for the token that is being activated |
| datetime | Contains the date and time that the consumer was validated by the issuer. This can be expressed in Greenwich Mean Time (GMT), in ccyymmddhhmmss format. |
| authcode | This can be an authorization code. It can contain a 6-character code generated by the authorizing entity (e.g., an issuer) that is specific to the current authentication code. It can be used by the authorizing entity and/or validation entity to solve problems or answer authentication related questions. It can be in any suitable format. For example, the format can be alphanumeric (for example, allowed characters can include: '0' through '9' and 'A' through 'Z' - characters can be in uppercase). It may also be generated using any suitable process (e.g., randomly, by encryption, hashing, etc.). |

The following may be sample data, prior to encryption:
pan=1234567890123456;datetime=20140424221300;authcode=846932
pan=1234567890123456;datetime=20140424221400; authcode=8AC93Z The constructed data is then encrypted. Once encrypted, it can then be converted to hexBinary format for inclusion in the Authentication Code as the encryptedinformation component.

B. Sample Authentication Code

The following is a sample of a constructed Authentication Code. Note that the encryptedinformation component shown is an example, but authentication codes can be shorter in length than the example shown below.
MBAAC-1-1-7AF291C91F3ED4EF92C1D45EFF127C1F9ABC12347E C. Zone Encryption Key Parameters The data encryption keys used to protect the encryptedinformation component can be double-length Triple-DES (TDEA) symmetric keys. They can be used for the sole purpose of transient data encryption between parties, and are generally not the same as PIN, MAC or other specific encryption keys.

The key(s) used can be conveyed between the authorizing entity and the validation entity using conventional key conveyance and protection schemes prior to use.

D. Encryption Block Formatting

The encryptedinformation component within the Authentication Code can be formatted using an encryption blocking scheme. A blocking scheme can help to protect Authentication Code from attack scenarios and can provide a consistent method for the receiving system to identify the significant data in the encryption block(s).

The following section describes the structure and formatting parameters for the encryption blocks prior to enciphering. Each of these encryption blocks can be specially formatted with a consistent structure to facilitate processing and additional security. The first block can contain additional control information that is not present in the remaining blocks.

A control field (first block only)—control fields may include any data used convey information to recipient necessary to process the information (e.g., formatting, character encoding)

A second control field (first block only)

Randomization digits or characters (first block only).

A two-digit data length field—includes the number of data digits or characters to be encrypted (first block only). Excludes control, reserved, length, fill and randomization digits or characters Data to be encrypted—normal 7-bit ASCII digits (second through last block) Contains the plain-text characters of the data to be protected in the encryptedinformation in an ASCII character format—it may use one or more 8-byte (64-bit) encryption blocks, as needed to accommodate the length of the data to be protected Remaining unused positions can include fill characters as needed An exemplary encryption block formatting process can be described below.

First Block

| | Bits | | | | | | |
|---|---|---|---|---|---|---|---|
| 1-8 | 9-16 | 17-24 | 25-32 | 33-40 | 41-48 | 49-56 | 57-64 |
| Data C1 | C2 | R | R | R | R | L1 | L2 |

Second Through Last Block

| | Bits | | | | | | |
|---|---|---|---|---|---|---|---|
| 1-8 | 9-16 | 17-24 | 25-32 | 33-40 | 41-48 | 49-56 | 57-64 |
| Data D | D/F | D/F | D/F | D/F | D/F | D/F | D/F |

In the example above, C1 can be control field 1. This can be a binary value such as 00100000 (a blank in ASCII text format). C2 can be control field 2. This can also be a binary value such as 00100000 (a blank in ASCII text format). R can be a randomization character. It may contain a random 7-bit ASCII character. L1 and L2 may indicate the length of the data. L1 and L2 may be embodied by two 7-bit ASCII digits containing the length (number of characters) of the data that is present in the encryption block. For example, L1=00110010 (ASCII '2') and L2=00110110 (ASCII '6') indicates twenty six characters are present. D can be Name/Value pair data (e.g., a 7-bit ASCII character). D/F can be a Name/Value pair data or fill character. The designation of these fields is determined by the length field. F can be a fill character. F can be a binary value such as 00100001 (T in ASCII text format).

The encryption blocks can be encrypted using the Triple-DES encryption algorithm (TDEA) with Cipher Block Chaining (CBC) to produce the encrypted data for inclusion in the encryptedinformation component of the Authentication Code. In some embodiments, the encryptedinformation component can be converted to a hexBinary format, prior to inclusion in the Authentication Code.

An example of encryption blocks (plain text—prior to enciphering) can be described as follows. The following data can be formatted so that it is included in the encryptedinformation component:
pan=1234567890123456;datetime=20140424221300;authcode=846932

Nine 64-bit encryption blocks can be constructed in plain text format (normal 7-bit ASCII-encoded characters) prior to encipherment.

| | Bits: | | | | | | | |
|---|---|---|---|---|---|---|---|---|
| | 1-8 | 9-16 | 17-24 | 25-32 | 33-40 | 41-48 | 49-56 | 57-64 |
| 1st block | | | Z | 0 | S | A | 6 | 0 |
| 2nd block | p | a | n | = | 1 | 2 | 3 | 4 |
| 3rd block | 5 | 6 | 7 | 8 | 9 | 0 | 1 | 2 |
| 4th block | 3 | 4 | 5 | 6 | ; | d | a | t |
| 5th block | e | t | i | m | e | = | 2 | 0 |
| 6th block | 1 | 4 | 0 | 4 | 2 | 4 | 2 | 2 |
| 7th block | 1 | 3 | 0 | 0 | ; | a | u | t |
| 8th block | h | c | o | d | e | = | 8 | 4 |
| 9th block | 6 | 9 | 3 | 2 | ! | ! | ! | ! |

Figure 9:
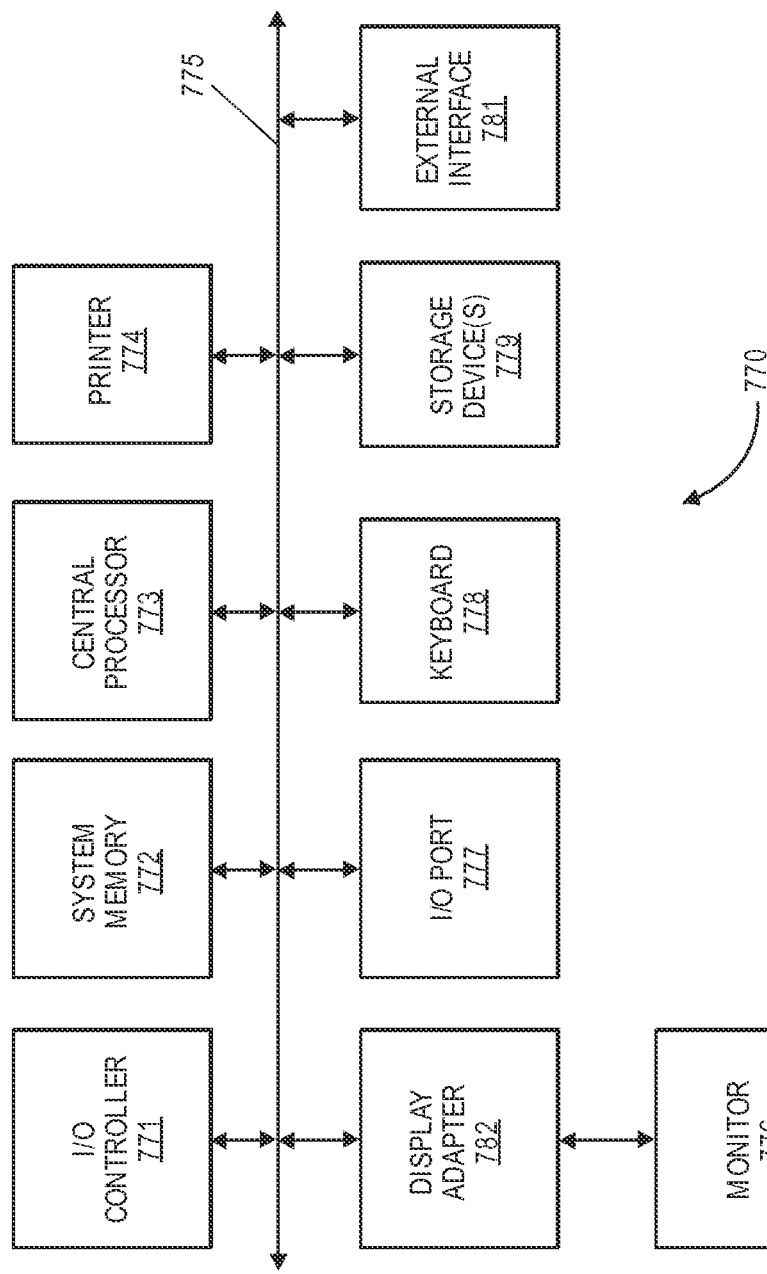
FIG. 9 shows a block diagram of a computer.

FIG. 9 is a high level block diagram of a computer system that may be used to implement any of the entities or components described above. The subsystems shown in FIG. 9 are interconnected via a system bus 775. Additional subsystems include a printer 774, keyboard 778, system memory 772, and monitor 776, which is coupled to display adapter 782. Peripherals and input/output (I/O) devices, which couple to I/O controller 771. For example, the external interface 722 can be used to connect the computer apparatus to a wide area network such as the Internet, a mouse input device, or a scanner, via an input/output port 777. The interconnection via system bus 775 allows the central processor 773 to communicate with each subsystem and to control the execution of instructions from system memory 772 or the storage device(s) 779, as well as the exchange of information between subsystems. The system memory 772 and/or the storage device(s) may be embodied by a computer-readable medium.

Embodiments of the invention have a number of advantages. For example, as noted above, in embodiments of the invention, an untrusted application may be provisioned with access data by first making the request for the access data using a trusted first application associated with an authorizing entity. The user and the authorizing entity can be confident that the request for the access data is authentic and not fraudulent. Also, the use of the above-described authentication code can allow a party other than the authorizing entity to provision the access data. Lastly, since the authentication code has an encrypted portion that a time data element, and an unencrypted portion that contains information on how to process the encrypted portion, the authentication code can be used by different parties to verify that the provisioning request is authentic and valid.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary

What is claimed is:

1. A method comprising:
   receiving, by a mobile device, user authentication data at a first application on the mobile device, wherein the first application is a mobile banking application;
   transmitting, by the mobile device, the user authentication data to an authorization computer system, which validates the authentication data, and then generates an authentication code by concatenating a first portion comprising encrypted information and a second portion comprising unencrypted information, the unencrypted information comprising a key index and the encrypted portion including an encrypted account number, date and time when the authentication data was validated, and authorization code;
   receiving, by the mobile device, from the authorization computer system, the authentication code via the first application, wherein the authentication code comprises the first portion comprising the encrypted information including the encrypted account number, date and time when the authentication data was validated, and authorization code, concatenated with the second portion comprising the unencrypted information, the unencrypted information comprising the key index;
   providing, by the mobile device, the authentication code from the first application to a second application on the mobile device through an application programming interface in the mobile device, wherein the second application is a digital wallet application;
   sending, by the second application on the mobile device, the authentication code to a validation entity computer via a digital wallet server, the validation entity computer locating a key using the key index in the authentication code, decrypting the encrypted portion with the key to determine the account number, the date and time, and the authorization code, determining that the authentication code is valid using at least the authorization code and the date and time when the authentication data was validated, and then instructing a provisioning server computer to provision the mobile device with access data related to the account number;
   receiving, by the second application on the mobile device and from the provisioning server computer in communication with the validation entity computer, the access data, the access data related to the account number; and
   conducting a transaction, by the mobile device, by providing the access data to an access device.

2. The method of claim 1 wherein the mobile device is a mobile phone.

3. The method of claim 1 wherein the validation entity computer is a transaction processing network.

4. The method of claim 1 wherein the access data comprises a payment token.

5. The method of claim 1 wherein the second portion comprising the unencrypted information comprises a type of the authentication code.

6. The method of claim 1, wherein the access data comprises a payment token, and wherein the access device generates and transmits an authorization request message comprising the payment token to an issuer of the account number.

7. The method of claim 1, wherein the key is a symmetric key, and wherein the validation entity computer decrypts at least a portion of the authentication code using the symmetric key that is shared with the authorization computer system.

8. The method of claim 1, wherein the access data comprises a payment token, and wherein the access device generates and transmits an authorization request message comprising the payment token to an issuer of the account number via an acquirer computer and a payment processing network.

9. The method of claim 8, wherein the payment processing network is configured to process credit and debit card transactions.

10. The method of claim 1, wherein the date and time when the authentication data was validated and the authorization code are concatenated and encrypted by the authorization computer system.

11. A system comprising:
a mobile device comprising
a first processor,
an antenna coupled to the processor, and
a first non-transitory computer readable medium coupled to the first processor, where the computer readable medium comprises code, executable by the first processor for implementing a method comprising:
receiving user authentication data at a first application on the mobile device, wherein the first application is a mobile banking application,
transmitting the user authentication data to an authorization computer system,
receiving an authentication code from the authorization computer system via the first application, wherein the authentication code comprises a first portion comprising encrypted information including an encrypted account number, date and time when the authentication data was validated, and authorization code, concatenated with a second portion comprising unencrypted information, the unencrypted information comprising a key index,
providing the authentication code from the first application to a second application on the mobile device through an application programming interface in the mobile device, wherein the second application is a digital wallet application,
sending the authentication code from the second application to a validation entity computer via a digital wallet server,
receiving, at the second application from a provisioning server computer, in communication with the validation entity, access data, the access data related to the account number; and
conducting a transaction by providing the access data to an access device;
the authorization computer system comprising a second processor and a second non-transitory computer readable medium coupled to the processor, the computer readable medium comprising code executable by the second processor for implementing a method comprising: validating the authentication data, and then generating the authentication code by concatenating the first portion comprising encrypted information and the second portion comprising unencrypted information, the unencrypted information comprising the key index and the encrypted portion including the encrypted account number, the date and time when the authentication data was validated, and the authorization code; and
the validation entity computer comprising a third processor and a third non-transitory computer readable medium, the third non-transitory computer readable medium comprising code, executable by the third processor for performing a method comprising: receiving the authentication code, locating a key using the key index in the authentication code, decrypting the encrypted portion with the key to determine the account number, the date and time, and the authorization code, determining that the authentication code is valid using at least the authorization code and the date and time when the authentication data was validated, and then instructing a provisioning server computer to provision the mobile device with the access data related to the account number.

12. The system of claim 11, wherein the access data is a payment token.

* * * * *